United States Patent
Jialanella et al.

(10) Patent No.: US 11,795,355 B2
(45) Date of Patent: Oct. 24, 2023

(54) ONE-COMPONENT HOT MELT POLYURETHANE ADHESIVE

(71) Applicant: DDP SPECIALTY ELECTRONIC MATERIALS US, LLC, Wilmington, DE (US)

(72) Inventors: Gary L Jialanella, Oxford, MI (US); Eric Cole, Auburn Hills, MI (US); Daniel Sophiea, Auburn Hills, MI (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 330 days.

(21) Appl. No.: 17/270,178

(22) PCT Filed: Aug. 5, 2019

(86) PCT No.: PCT/US2019/045071
§ 371 (c)(1),
(2) Date: Feb. 22, 2021

(87) PCT Pub. No.: WO2020/040965
PCT Pub. Date: Feb. 27, 2020

(65) Prior Publication Data
US 2021/0309896 A1 Oct. 7, 2021

Related U.S. Application Data

(60) Provisional application No. 62/722,226, filed on Aug. 24, 2018.

(51) Int. Cl.
| | | |
|---|---|---|
| C09J 175/06 | (2006.01) |
| C08G 18/12 | (2006.01) |
| C08G 18/24 | (2006.01) |
| C08G 18/30 | (2006.01) |
| C08G 18/32 | (2006.01) |
| C08G 18/38 | (2006.01) |
| C08G 18/42 | (2006.01) |
| C08G 18/08 | (2006.01) |
| C08G 18/76 | (2006.01) |
| C08G 18/40 | (2006.01) |
| C08G 18/78 | (2006.01) |
| C08G 18/20 | (2006.01) |
| C08G 18/66 | (2006.01) |
| C08G 18/48 | (2006.01) |

(52) U.S. Cl.
CPC ........ *C09J 175/06* (2013.01); *C08G 18/0885* (2013.01); *C08G 18/12* (2013.01); *C08G 18/2081* (2013.01); *C08G 18/24* (2013.01); *C08G 18/307* (2013.01); *C08G 18/3215* (2013.01); *C08G 18/3844* (2013.01); *C08G 18/4009* (2013.01); *C08G 18/4202* (2013.01); *C08G 18/4238* (2013.01); *C08G 18/4829* (2013.01); *C08G 18/664* (2013.01); *C08G 18/7664* (2013.01); *C08G 18/78* (2013.01); *C08G 2170/20* (2013.01); *C09J 2301/304* (2020.08); *C09J 2301/306* (2020.08)

(58) Field of Classification Search
CPC ................ C09J 175/06; C09J 2301/304; C09J 2301/306; C08G 18/12; C08G 18/24; C08G 18/307; C08G 18/3215; C08G 18/3844; C08G 18/4202; C08G 18/4238; C08G 2170/20; C08G 18/0885; C08G 18/2081; C08G 18/4009; C08G 18/4829; C08G 18/664; C08G 18/7664; C08G 18/78
See application file for complete search history.

(56) References Cited

U.S. PATENT DOCUMENTS

| | | |
|---|---|---|
| 5,618,904 A | 8/1997 | Martin et al. |
| 2009/0159205 A1* | 6/2009 | Wang .................... C09J 175/04 528/65 |

FOREIGN PATENT DOCUMENTS

| | | |
|---|---|---|
| WO | 2015129529 | 9/2015 |

* cited by examiner

*Primary Examiner* — Rabon A Sergent

(57) ABSTRACT

One-component, moisture-curable polyurethane adhesives exhibit excellent handling strength before being fully cured, and excellent creep properties after curing. The adhesives include an isocyanate-terminated prepolymer made from polyols that include a crystalline polyester and hydroquinone bis (2-hydroxyethyl) ether, and a polyoxazolidine compound.

11 Claims, No Drawings

ONE-COMPONENT HOT MELT POLYURETHANE ADHESIVE

This invention relates to one-component hot-melt polyurethane adhesives.

Polyurethanes are well-known adhesives. They are extremely versatile in that they can be formulated into general purpose glues as well as a wide variety of specialized glues adapted for use in specific applications.

The transportation vehicle industry has in recent years turned more and more to adhesives to assemble their products. This trend has been driven partially by the replacement of metals by lighter-weight plastics and composites and in part by the desire to simplify manufacturing processes by reducing the number of welds and mechanical fasteners that are used. Several different adhesives are needed because of, for example, the different substrates to be glued in various instances, the different curing conditions that can be brought to bear at different points of the assembly process, and the adhesive, mechanical and other properties that are needed in the cured adhesive. The adhesive in each instance must be tailored to meet specific demands.

For example, headlamp and other automotive lighting fixtures are commonly made from plastic materials. Adhesives sometimes are used to assemble the component parts and to mount the fixture to the vehicle. Elevated temperature curing is impractical at this particular stage of the vehicle manufacturing process, so the adhesive must cure at ambient or near-ambient temperatures. On the other hand, the adhesive must be able to support the weight of the part very shortly if not immediately after being applied. These demands have led manufacturers to select hot-melt polyurethane adhesives for this application. These adhesives can be formulated to cure at room temperature. They can be applied as a warm fluid that subsequently cools and solidifies to provide initial adhesion. By solidifying rapidly upon cooling, the adhesive does not run off of vertical or other inclined surfaces.

Adhesives developed for this application have two main shortcomings. They do not develop adhesive strength rapidly enough after being applied. The additional strength the adhesive develops by simply cooling and solidifying often is insufficient; the needed strength is achieved only by curing. Therefore, the adhesive needs to rapidly develop bond strength after it is applied, even at room temperature.

The other problem is "creep", which is a progressive deformation over time under load, the load in this case being the weight of the part.

It would be desired to provide a hot melt, polyurethane adhesive that cures at or near room temperature, bonds strongly to plastics and composites, and which exhibits good initial strength and low creep.

This invention is in one aspect a one-component, moisture-curable, hot melt polyurethane adhesive composition which is a heat-softenable room temperature solid comprising:
  A) 50 to 98% by weight of the adhesive composition of a polyurethane prepolymer containing free isocyanate groups, the prepolymer being a reaction product of:
    1) a mixture of polyols that comprises
      i) at least 35 weight percent, based on the weight of the mixture of polyols, of at least one hydroxyl-terminated polyester that is liquid at 22° C.;
      ii) at least 10 weight percent, based on the weight of the mixture of polyols, of at least one hydroxyl-terminated polyester that is a solid at 22° C. and exhibits a crystalline melting temperature of 70 to 130° C.; and
      iii) 5 to 20 weight percent, based on the weight of the mixture of polyols, of hydroquinone bis-(2-hydroxyethyl) ether; with
    2) an excess of at least one organic polyisocyanate;
  B) 1 to 10% by weight of at least one polyoxazolidine compound having a molecular weight of up to 2000; and
  C) a catalytically effective amount of a catalyst for a reaction of water with an isocyanate group.

The invention is also a cured adhesive formed by curing the one-component polyurethane adhesive composition of the invention. The invention is also a method of bonding two substrates, comprising forming a layer of the one-component polyurethane adhesive at a bondline between two substrates and curing the layer at the bondline to form a cured adhesive bonded to each of the substrates.

The cured adhesive provides the desired good initial strength and low creep. It adheres strongly to plastics and composites (as well as to other materials) and does not require an elevated temperature cure.

The adhesive of the invention is a one-component, moisture curing material. By "one-component" it is meant that all ingredients of the adhesive (except $H_2O$ which is supplied during moisture-curable) are formed into a single blended material. By "moisture-curable", it is meant that the adhesive can cure via a mechanism that includes at least in part a reaction of water with one or more components of the adhesive. In particular, the moisture cure involves i) a reaction of water with free isocyanate groups of the prepolymer, ii) a reaction of water with the polyoxazolidine compound to generate amino and/or hydroxyl groups that further react with free isocyanate groups of the prepolymer or iii) both i) and ii).

By "hot melt" it is meant the adhesive, before curing, has the physical form of a room temperature (22° C.) solid that heat-softens at some elevated temperature to form a pumpable fluid. The adhesive preferably is a solid that heat-softens at a temperature of at least 40° C., at least 50° C., at least 60° C. or at least 70° C. and resolidifies upon cooling. It preferably melt-softens at a temperature of no greater than 150° C., more preferably no greater than 120° C. The adhesive may be a semi-crystalline material that exhibits one or more crystalline melting temperatures from 40 to 150° C., especially from 70 and 130° C.

The adhesive contains a polyurethane prepolymer that contains free isocyanate groups. The prepolymer may contain, for example, at least 1%, at least 2% or at least 3% by weight of isocyanate groups, based on the weight of the prepolymer and, for example, up to 8% or up to 6% isocyanate groups on the same basis. The adhesive may contain, for example, at least 0.5, at least 1% or at least 2% of isocyanate groups, based on the weight of the adhesive, and may contain up to 8%, up to 6%, up to 5% or up to 4% thereof on the same basis.

The prepolymer is a reaction product of a mixture of polyols with at least one organic polyisocyanate.

The mixture of polyols includes at least one hydroxyl-terminated polyester that is liquid at 22° C. This polyester may have a hydroxyl equivalent weight of, for example, at least 250, at least 500 or at least 700 and, for example, up to 2500, up to 2000, up to 1500 or up to 1200. It may have a number average of 1.5 to 6, preferably 1.8 to 3 and especially 1.8 to 2.2, hydroxyl groups per molecule. This polyester may be include aromatic groups or be non-aromatic. If non-aromatic, it may be saturated or unsaturated, and may include cycloaliphatic groups. The liquid hydroxyl-terminated polyester may have a glass transition temperature of 0° C. or lower, such as −20° C. or lower or −30° C. or lower. Examples of suitable polyesters include poly(alkylene adipates), poly(alkylene succinates), poly(alkylene valerates), poly(alkylene adipate-succinates), poly(alkylene azelates), poly(alkylene sebacates) and the like as well as polylactones such as poly(caprolactone), in each case being a liquid at 22° C. as described before.

The alkylene groups of the polyester polyol, which all may be the same or may include mixtures of two or more alkylene groups, may have, for example 2 to 12 carbon atoms and may be linear, branched and/or cyclic. Examples of alkylene groups include ethyl, n-propyl, isopropyl, n-butyl, neopentyl, n-pentyl, n-hexyl, n-octyl and the like. A 1,4-butanediol/isopentyl glycol adipate is an example of a useful liquid hydroxyl-terminated polyester.

The liquid, hydroxyl-terminated polyester constitutes at least 35 percent of the total weight of the mixture of polyols. It may constitute at least 50 percent thereof or at least 60 percent thereof and may constitute up to 85 weight percent thereof or up to 75 weight percent thereof. Two or more liquid, hydroxyl-terminated polyesters may be used.

The mixture of polyols includes at least one hydroxyl-terminated polyester that is a solid at 22° C. and exhibits a crystalline melting temperature of 70 to 130° C., as measured by DSC such as according to the DIN 53 765 method. The crystalline melting temperature may be at least 75° C. or at least 80° C. and may be up to 120° C., up to 110° C. or up to 100° C. This polyester may have a hydroxyl equivalent weight of, for example, at least 500, at least 700, at least 1000 or at least 1500 and, for example, up to 5000, up to 3500, or up to 2500. It may have a number average of 1.5 to 6, preferably 1.8 to 3 and especially 1.8 to 2.2, hydroxyl groups per molecule. This polyester may be include aromatic groups or be non-aromatic. If non-aromatic, it may be saturated or unsaturated, and may include cycloaliphatic groups. Examples of suitable polyesters include polyester polyols corresponding to a condensation product of one or more aliphatic polyols (linear, branched or cyclic) or aromatic polyols such as ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyldiethanolamine and the mixtures of these compounds, with one or more polycarboxylic acids such as 1,6-hexanedioic acid, dodecanedioic acid, azelaic acid, sebacic acid, adipic acid, 1,18-octadecanedioic acid, phthalic acid, terephthalic acid, fumaric acid, maleic acid, succinic acid and mixtures of any two or more these acids, an unsaturated anhydride, or an ester or anhydride derivative thereof such as maleic or phthalic anhydride, the polyester polyol in each case being a solid at 22° C. and having a crystalline melting temperature as described above. A specific example is a poly(hexylene adipate). Useful commercially available materials include polyesters sold by Evonik Corporation under the trade name Dynacoll®, including Dynacoll 7380, Dynacoll 7330, Dynacoll 7340, Dynacoll 7331, Dynacoll 7390 and Dynacoll 7321.

The solid polyester having a crystalline melting temperature of 70 to 130° C. constitutes at least 10 percent of the weight of the mixture of polyols. It may constitute at least 12, or at least 15 weight percent thereof and, for example, up to 60, up to 40, up to 30 or up to 25 weight percent thereof.

The mixture of polyols contains 5 to 20 weight percent, based on the weight of the mixture of polyols, of hydroquinone bis-(2-hydroxyethyl) ether. A preferred amount is 5 to 15 weight percent, 5 to 10 weight percent or 5 to 8 weight percent.

The mixture of polyols may contain one or more optional polyols. Examples of these include chain extenders, i.e. compounds other than hydroquinone bis(2-hydroxyether) ether having hydroxyl equivalent weights of 200 or less and exactly 2 hydroxyl groups per molecules, crosslinkers, i.e., compounds having three or more hydroxyl groups and hydroxyl equivalent weights of 200 or less; polyether polyols having hydroxyl equivalent weights of greater than 200, and solid (at 22° C.) polyester polyols having crystalline melting temperatures from above 22° C. to less than 70° C., especially 30 to 65° C.

Examples of chain extenders include 1,2-ethane diol, 1,2- or 1,3-propane diol, 1,4-butane diol, diethylene glycol, triethylene glycol, dipropylene glycol, tripropylene glycol, neopentyl glycol and alkoxylates of any of the foregoing having a hydroxyl equivalent weight of up to 200. Chain extenders, if present, preferably constitute no more than 5%, more preferably no more than 2%, of the weight of the mixture of polyols. Chain extenders can be absent from the mixture of polyols.

Examples of crosslinkers include glycerin, trimethylolpropane, trimethylolethane, erythritol, pentaerythritol, triethanolamine, diethanolamine and alkoxylates of any of the foregoing having a hydroxyl equivalent weight of 200 or less. Crosslinkers, if present, preferably constitute no more than 5%, more preferably no more than 2%, and even more preferably no more than 1% or no more than 0.5% of the weight of the mixture of polyols. Crosslinkers can be absent from the mixture of polyols.

Polyether polyols having hydroxyl equivalent weights of greater than 200 include polymers of propylene oxide, ethylene oxide, butylene oxide, tetrahydrofuran and the like, and or random and/or block copolymers of any two or more thereof. Such polyether polyols may have hydroxyl equivalent weights, for example, up to 5000, up to 3000, up to 2000, up to 1500 or up to 1200. If present at all, the polyether polyol may constitute, for example, up to 25%, up to 20%, up to 15%, up to 10% or up to 5% of the total weight of the mixture of polyols. Polyether polyols may be absent from the mixture of polyols.

A solid (at 22° C.) polyester polyol having a crystalline melting temperature from above 22° C. to less than 70° C., especially 30 to 65° C., if present at all, may constitute from 0.01 to 35 percent of the total weight of the mixture of polyols. A preferred amount, if present at all, is up to 20 percent, up to 15 percent, up to 10 percent or up to 5 percent. The composition, hydroxyl equivalent weight and hydroxyl functionality of the solid (at 22° C.) polyester polyol having a crystalline melting temperature from above 22° C. to less than 70° C. may be as described generally above with respect to the solid polyester having melting temperature of 70 to 130° C. Commercially available materials that are suitable include those sold by Evonik Corporation as Dynacoll® 7255, Dynacoll 7362, Dynacoll 7360, Dynacoll 7363, Dynacoll 7365, Dynacoll 7361 and Dynacoll 7381.

In some embodiments, the optional polyols together constitute no more than 20%, no more than 15%, no more than 10%, no more than 5%, no more than 2% or no more than 1% of the total weight of the mixture of polyols.

The mixture of polyols preferably has a number average hydroxyl functionality of no greater than 2.5, especially no greater than 2.2, to prevent crosslinks from forming in the prepolymer.

The organic polyisocyanate preferably has an isocyanate equivalent weight of up to 350 and 2 to 4 isocyanate groups per molecule. The organic polyisocyanate compound may have, for example an average of 2 to 4 or 2.3 to 3.5 isocyanate groups per molecule. The isocyanate equivalent weight in some embodiments is 80 to 250, 80 to 200, or 80 to 180.

Among the useful polyisocyanate compounds are m-phenylene diisocyanate, toluene-2,4-diisocyanate, toluene-2,6-diisocyanate, naphthylene-1,5-diisocyanate, methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4''-triphenyl methane triisocyanate, polymethylene polyphenylisocyanate (PMDI), toluene-2,4,6-triisocyanate, 4,4'-dimethyldiphenylmethane-2,2',5,5'-tetraisocyanate cyclohexane diisocyanate, 1,3- and/or 1,4-bis(isocyanatomethyl)cyclohexane, 1-methyl-cyclohexane-2,4-diisocyanate, 1-methyl-cyclohexane-2,6-diisocyanate, methylene dicyclohexane diisocyanate, isophorone diisocyanate and hexamethylene diisocyanate. Modified aromatic polyisocyanates that contain urethane, urea, biuret, carbodiimide, uretoneimine, allophonate or other groups formed by reaction of an isocyanate groups are also useful. A preferred aromatic polyisocyanate is MDI or PMDI (or a mixture thereof that is commonly referred to as "polymeric MDI"), and so-called "liquid MDI" products that are mixtures of MDI and MDI derivatives that have biuret, carbodiimide, uretoneimine or allophonate linkages. Mixtures of two or more of the foregoing can be used to make the prepolymer The polyisocyanate is provided in excess, the relative amounts of the polyisocyanate and mixture of polyols being selected so after the reaction the resulting prepolymer has an isocyanate content as described before. Preferably, 0.8 to 1.2 moles of polyisocyanates are reacted per equivalent of hydroxyl groups in the mixture of polyols.

The prepolymer is prepared by reacting the polyisocyanate with the mixture of polyols. It is generally preferred to combine the various polyols prior to reaction, although the polyols can be reacted sequentially with the polyisocyanate in sub-combinations or individually. This reaction is conveniently performed at elevated temperature in the presence of a urethane catalyst. Water is preferably excluded from the prepolymer-forming by, for example, drying the polyols beforehand and performing the reaction under vacuum or inert gas such as nitrogen. A filler as described below may be present during the prepolymer-forming reaction. The reaction is generally continued until the hydroxyl groups of the mixture of polyols have been consumed and a target or constant isocyanate content has been obtained.

The prepolymer by itself is generally characterized in having free isocyanate groups and in being, prior to curing, a room temperature solid material that heat softens at an elevated temperature of, for example, 70 to 130° C. The prepolymer may or may not exhibit a crystalline melting temperature within that temperature range.

The adhesive of the invention is made by mixing the prepolymer with a polyoxazolidine compound having a molecular weight of up to 2000 and a catalyst for a reaction of water with an isocyanate group.

The polyoxazolidine compound is characterized in having two or more oxazolidine groups. Oxazolidine groups have the structure:

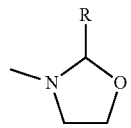

wherein R is hydrogen, alkyl, aryl-substituted alkyl, phenyl or alkyl-substituted phenyl. R is preferably $C_{1-6}$ alkyl, especially isopropyl. The polyoxazolidine compound may have, for example, 2 to 4 oxazolidine groups. The oxazolidine groups may be connected via a one or more linking groups bonded to the oxazolidine groups via a ring nitrogen or either of the two adjacent ring carbons. If not bonded to a linking group, the ring nitrogen is bonded to a hydrogen, alkyl, aryl-substituted alkyl, phenyl or alkyl-substituted phenyl group.

The linking group may contain, for example, one or more urethane, ester, carbonate or other heteroatom-containing groups.

Examples of useful oxazolidine compounds include those having either of structures I or II:

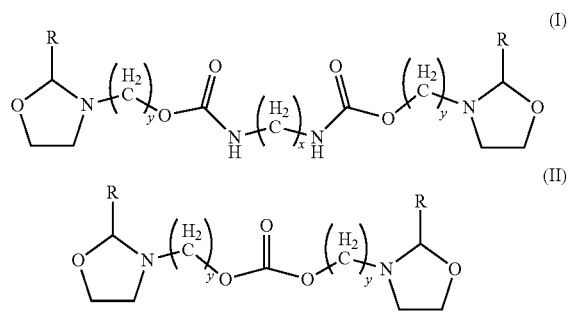

wherein R is as before, x is from 1 to 20, especially 2 to 12 or 2 to 8, and each y is independently 1 to 20, especially 2 to 12 or 2 to 8.

A useful bis-oxazolidine compound according to structure I, in which each y is 2, x is 6 and R is isopropyl is sold by Arnette Polymers LLC as Arnox 4. A useful bis-oxazolidine compound according to structure II, in which each y is 2 and R is isopropyl is sold by Arnette Polymers LLC as Arnox 4LV.

The catalyst is a material that catalyzes the reaction of water with an isocyanate groups. It may also catalyze the reaction of a hydroxyl group with an isocyanate group. Suitable catalysts include, for example, include tertiary amines, cyclic amidines, tertiary phosphines, various metal chelates, acid metal salts, strong bases, various metal alcoholates and phenolates and metal salts of organic acids. Tertiary amine catalysts are a preferred type.

Examples of tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Useful amidine catalysts include 1,8-diazabicyclo[5.4.0]-undec-7-ene. An especially preferred catalyst is 2,2-dimorpholinodiethyl ether.

The adhesive conveniently is prepared by mixing the prepolymer, oxazolidine compound and catalyst. The mixing conditions should include the absence of water to prevent premature curing. Because the prepolymer is typically a room temperature solid, the mixing conditions also typically include an elevated temperature such as 700 to 150° C. to heat-soften the prepolymer so the other ingredients can be blended into it.

The adhesive contains 50 to 98% by weight of the prepolymer, based on the total weight of the adhesive. The adhesive may contain at least 60 weight-% at least 70 weight-% of the prepolymer and may contain up to 90 weight-% or up to 80 weight-% thereof, on the same basis. The adhesive contains 1 to 10 weight % of the oxazolidine compound on the same basis. It may contain at least 2 weight-% or at least 3 weight-% up to 8 weight-% or up to 7 weight-% thereof.

The catalyst is present in a catalytically effective amount. For example, the adhesive may contain 0.01 to 2 weight percent of the catalyst, with a preferred amount being 0.025 to 0.5 weight percent, based on the weight of the adhesive.

The adhesive may contain various optional ingredients. A preferred optional ingredient is at least one particulate filler. Such a filler may constitute, for example, 1 to 45, especially 5 to 40, weight percent of the total weight of the adhesive. The particulate filler is in the form of particles having a longest dimension of 50 nm to 100 m. The fillers may have a longest dimension of at least 250 nm, at least 500 nm or at least 1 m, up to, for example, 50 m, 25 m or 10 m.

The particulate filler is a material that is solid at room temperature, is not soluble in the other ingredients of the adhesive and does not melt, volatilize or degrade under the conditions of manufacturing the prepolymer (if present during the prepolymer-forming step) or adhesive, or under the conditions of applying and curing the adhesive. The filler may be, for example, an inorganic filler such as glass, silica, boron oxide, boron nitride, titanium oxide, titanium nitride, fly ash, calcium carbonate, various alumina-silicates including clays such as wollastonite and kaolin, a metal particles such as iron, titanium, aluminum, copper, brass, bronze and the like; thermoset polymer particles such as polyurethane, cured epoxy resin, phenol-formaldehyde, cresol-formaldehyde, crosslinked polystyrene and the like; thermoplastics such as polystyrene, styrene-acrylonitrile copolymers, polyimide, polyamide-imide, polyether ketone, polyether-ether ketone, polyethyleneimine, poly(p-phenylene sulfide), polyoxymethylene, polycarbonate and the like; and various types of carbon such as activated carbon, graphite, carbon black and the like. In some embodiments, the particulate filler excludes carbon particles. The particles in some embodiments have an aspect ratio of up to 5, preferably up to 2, more preferably up to 1.5.

Some or all of the filler particles can be grafted onto one or more of the polyether polyol(s) that constitute ingredient (a) of the polyol component.

Another useful optional ingredient of the adhesive is a desiccant such as fumed silica, silica gel, aerogel, various zeolites and molecular sieves, and the like. Desiccants may constitute up to 5 weight percent, preferably up to 2 weight percent, of the adhesive, and may be absent therefrom.

The adhesive of the invention preferably contains no more than 0.5% by weight, more preferably no more than 0.1% by weight, of organic compounds having a boiling temperature of 100° C. or lower. Prior to curing, the adhesive preferably contains no more than 0.1% by weight, more preferably no more than 0.05% by weight, of water.

The adhesive of the invention in some embodiments contains no more than 10 weight percent, more preferably no more than 5 weight percent, and even more preferably no more than 1 weight percent, of plasticizer such as a phthalate, terephthalate, mellitate, sebacate, maleate or other ester plasticizer, a sulfonamide plasticizer, a phosphate ester plasticizer, or a polyether di(carboxylate) plasticizer. The adhesive may be devoid of such a plasticizer.

The adhesive preferably is packaged and stored (if not used immediately after preparation) in the absence of moisture.

The invention is also a process for bonding two substrates. The adhesive is heat-softened, preferably in the absence of water, to form a flowable material that is formed into a layer between and in contact with the two substrates. A suitable heat-softening temperature is 70 to 130° C. After being formed into an adhesive layer between the two substrates, the adhesive may be cooled to below 40° C. to harden it, in that manner forming a temporary bond. The layer is then cured at the bondline by contacting it with $H_2O$ to form a cured adhesive bonded to each of the substrates. The $H_2O$ may be in the liquid and/or gaseous aggregative state. In a preferred process, the $H_2O$ is atmospheric moisture that is contacted with the adhesive layer by exposure to the atmosphere. As discussed before, curing proceeds via one or more reactions of water with the isocyanate groups of the prepolymer and/or the oxazolidine groups of the polyoxazolidine compounds.

Curing preferably is performed at a temperature below 70° C., especially below 40° C., to avoid heat-softening the adhesive layer. A preferred curing temperature is 15 to 40° C. Exposure to air at ambient temperature and humidity for a period of 12 hours to several days is generally sufficient to cure the adhesive.

An adhesion promoter may be applied to one or both of the substrates prior to contacting the substrate(s) with the adhesive. However, this is optional and may be omitted.

The substrates are not limited. They can be, for example, a metal, a metal alloy, an organic polymer, a lignocellulosic material such as wood, cardboard or paper, a ceramic material, various types of composites, or other materials. Carbon fiber reinforced plastic, filled polypropylene and polycarbonate are substrates of particular interest. The substrates in some embodiments are vehicular parts or vehicular sub-assemblies. The substrates in other embodiments are individual plies that are glued together using the adhesive of the invention to form a multilayer laminate. The substrates in other embodiments are building members.

The following examples are provided to illustrate the invention, but are not intended to limit the scope thereof. All parts and percentages are by weight unless otherwise indicated. In the following examples:

HQEE is hydroquinone bis(2-hydroxyethyl) ether, having a hydroxyl equivalent weight of about 100.

Crystalline Polyester A is a saturated polyester having a crystalline melting temperature of 85° C., a hydroxyl number of about 30.5 (equivalent weight approximately 1840) and a number average molecular weight of about 3500.

Crystalline Polyester B is a saturated polyester having a crystalline melting temperature of 53° C., a hydroxyl number of about 50.5 (equivalent weight approximately 1110) and a number average molecular weight of about 2000.

The Liquid Polyester is a 1000 equivalent weight, nominally difunctional poly(butylene/neopentyl)adipate in which the mole ratio of butylene to neopentyl units is approximately 55:45. This material is a liquid at 22° C.

The Crosslinker is a nominally trifunctional propoxylated glycerin having a hydroxyl equivalent weight of about 88.

The Liquid MDI is a modified diphenylmethane diisocyanate product having an isocyanate functionality of about 2.2 and equivalent weight of about 143.

EXAMPLE 1 AND COMPARATIVE SAMPLES A-D

Talc-filled NCO polyurethane prepolymers are made from the formulations indicated in Table 1.

TABLE 1

| | Parts by Weight | | | | |
|---|---|---|---|---|---|
| Ingredient | Comp. A* | Comp. B* | Comp. C* | Comp. D* | Ex. 1 |
| HQEE | 2.65 | 3.05 | 2.65 | 2.30 | 2.95 |
| Crystalline Polyester A | 15.00 | 0 | 0 | 15.00 | 9.00 |
| Crystalline Polyester B | 0 | 0 | 15.00 | 15.00 | 0 |
| Liquid Polyester | 36.52 | 48.62 | 35.42 | 22.00 | 40.72 |
| Crosslinker | 0.23 | 0.23 | 0.23 | 0.23 | 0.23 |
| Liquid MDI | 20.50 | 23.00 | 21.60 | 20.37 | 22.00 |
| Tin Catalyst | 0.002 | 0.002 | 0.002 | 0.002 | 0.002 |
| Talc | 20.00 | 20.00 | 20.00 | 20.00 | 20.00 |

In each case, the polyesters, crosslinker and HQEE are dried at 105° C. under vacuum for 24 hours. The talc is dried at 200° C. for 24 hours. The dried materials are kept under nitrogen until used.

The dried polyesters, crosslinker and HQEE are charged to a reactor and heated with agitation to 95° C. under nitrogen until the HQEE has dissolved. The talc is added and the mixture is maintained at the same temperature with agitation until the talc has dispersed. The polyisocyanate is added and the resulting reaction stirred under nitrogen until the exothermic temperature rise is completed. The tin catalyst is then added. And the mixture is heated under nitrogen to 120° C. to complete the prepolymer-forming reaction. The resulting product is an isocyanate-terminated polyurethane prepolymer. The prepolymer (exclusive of talc) in each case contains approximately 4% isocyanate groups. The filled prepolymer contains about 3.3% isocyanate groups.

To make the adhesive, the hot talc-filled prepolymer in each case is combined under nitrogen with 0.10 parts 2,2-dimorpholinodiethyl ether and 5 parts of a bis-oxazolidine having the structure:

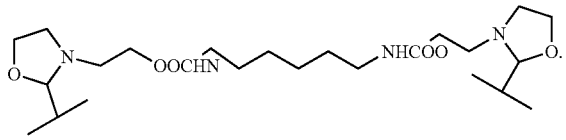

The bis-oxazolidine has a molecular weight of about 518. After thorough mixing, the resulting adhesive is poured into cartridges and sealed.

When cooled, the adhesives each are room temperature solids that have viscosities of over 1,000,000 cps at 25° C.

Each of Comparative Samples A-D and Example 1 are evaluated for bonding a 40%-talc-filled polypropylene sheet to polycarbonate. The dimensions of the test sheets are 3.8 mm thick, 2.54 cm wide and 110.6 cm in length. The polypropylene sheet is plasma treated approximately an hour before the adhesive is applied to produce a surface energy of at least 60 dynes/cm. 0.76 mm glass spacer beads are applied to a surface of the polypropylene substrate. The adhesive in each case is melted by heating to 120° C. and applied onto the polypropylene substrate. The polycarbonate sheet is applied over the adhesive to produce a 25.4 mm overlap. The assembled specimens in each case are bound together with binder clips and cured for 3 days at 25° C. and 80% relative humidity for creep testing. Duplicate specimens are cured for 10 minutes at ambient temperature and humidity to evaluate handling strength.

Handling strength is performed on the 10-minute-cured samples by measuring lap shear strength according to ISO standard ISO 4587. The apparatus is an Instron® 5500R Materials Testing System equipped with mechanical grips. The distance between grips is 17.8 cm and the crosshead speed is 12.7 mm/minute. On this test, a handling strength of at least 300 N is considered adequate.

Creep testing is performed by punching holes at each end of the fully cured specimens. The specimen is hung from one end by a hook, and from the other end a 4.5 kg weight is attached via another hook. After 24 hours at 85° C., the specimens are visually inspected. A "pass" rating indicates that no visible movement of the adhesive joint is seen. A "fail" rating indicates movement or failure of the adhesive joint.

Results are as indicated in Table 2.

TABLE 2

| Designation | Handling Strength, N | Creep at 85° C./ 24 hours |
|---|---|---|
| Comp. A* | 561 | Fail |
| Comp. B* | 33 | Pass |
| Comp. C* | 25 | Fail |
| Comp. D* | 534 | Fail |
| Ex. 1 | 304 | Pass |

Comparative Sample B shows the effect of including about 6% of the HQEE in the mixture of polyols without the presence of a polyester having a crystalline melting temperature of 70 to 130° C. Handling strength is poor, although adequate creep performance is obtained.

Adding a crystalline polyester that has a melting temperature of only about 53° C. to a polyol mixture that contains about 4.8% HQEE (Comp. Sample C) worsens handling strength and creep performance.

Comp. Sample D contains both the higher-melting and lower-melting crystalline polyesters, but the polyol mixture contains only about 4.2% of the HQEE. This combination allows one to obtain very good handling strength, but creep performance is poor.

Comp. A contains the high-melting crystalline polyester and the polyol mixture used to make the prepolymer contains about 4.8% of the HQEE. Handling strength is good, but creep performance is again poor.

Example 1 achieves a good balance of handling strength and creep performance. Handling strength is about 300 N, which is satisfactory. The polyol mixture in Example 1 contains 5.6% HQEE and 17% of the high-melting polyester.

This data set suggests that handling strength is strongly dependent on the presence of the crystalline polyester having a melting temperature of 70 to 130° C. during prepolymer preparation; Example 1, which is made using less of that material than Comparative Samples A and B, it is believed to have somewhat lower handling strength for that reason.

Increasing the amount of that material would be expected, on the basis of this data set, to further increase handling strength to be commensurate with those of Comp. Samples A and D.

On the other hand, the data for Comp. Samples A-D suggests that the presence of that polyester in the prepolymer preparation has an adverse effect on creep. Compare, for example, the creep results for Comp. Sample B with those of Comp. Samples A, C and D. When coupled with the requisite amount of HQEE, however, good creep performance is obtained despite the presence of that polyester during the prepolymer preparation.

What is claimed is:

1. A one-component, moisture-curable, hot melt polyurethane adhesive composition which is a heat-softenable room temperature solid comprising:
   A) 50 to 98% by weight, based on the total weight of the adhesive composition, of a polyurethane prepolymer containing free isocyanate groups, the prepolymer being a reaction product of:
      1) A mixture of polyols that comprises
         i) at least 35 weight percent, based on the weight of the mixture of polyols, of at least one hydroxyl-terminated polyester that is liquid at 22° C.;
         ii) at least 10 weight percent, based on the weight of the mixture of polyols, of at least one hydroxyl-terminated polyester that is a solid at 22° C. and exhibits a crystalline melting temperature of 70 to 130° C.; and
         iii) 5 to 20 weight percent, based on the weight of the mixture of polyols, of hydroquinone bis-(2-hydroxyethyl) ether; with
      2) An excess of at least one organic polyisocyanate;
   B) 1 to 10% by weight, based on the total weight of the adhesive composition, of at least one polyoxazolidine compound having a molecular weight of up to 2000; and
   C) a catalytically effective amount of a catalyst for a reaction of water with an isocyanate group.

2. The one-component, moisture-curable, hot melt polyurethane adhesive composition of claim 1 wherein component ii) has a crystalline melting temperature of 75 to 100° C.

3. The one-component, moisture-curable, hot melt polyurethane adhesive composition of claim 1 wherein component ii) has a hydroxyl equivalent weight of 700 to 2500 and a hydroxyl functionality of 1.8 to 3.

4. The one-component, moisture-curable, hot melt polyurethane adhesive composition of claim 1 wherein component i) has a hydroxyl equivalent weight of 700 to 1500 and a hydroxyl functionality of 1.8 to 3.

5. The one-component, moisture-curable, hot melt polyurethane adhesive composition of claim 1 wherein the polyoxazolidine compound is represented by structure I or structure II:

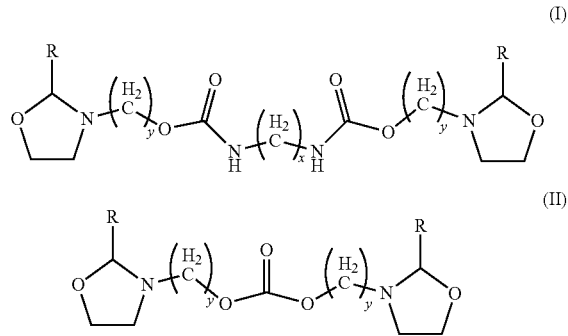

wherein R is hydrogen, alkyl, aryl-substituted alkyl, phenyl or alkyl-substituted phenyl, x is from 1 to 20, and each y is independently 1 to 20.

6. The one-component, moisture-curable, hot melt polyurethane adhesive composition of claim 5 wherein the polyoxazolidine compound has the structure:

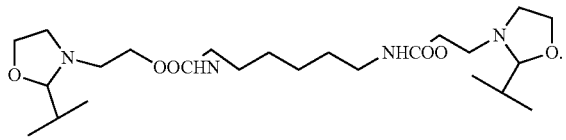

7. The one-component, moisture-curable, hot melt polyurethane adhesive composition of claim 1 wherein the mixture of polyols contains 12 to 25% by weight of component ii), based on the weight of the mixture of polyols.

8. A cured adhesive formed by curing the one-component polyurethane adhesive composition of claim 1.

9. A cured adhesive formed by contacting the one-component polyurethane adhesive composition of claim 1 with $H_2O$.

10. A method of bonding two substrates, comprising forming a layer of the one-component polyurethane adhesive of claim 1 at a bondline between two substrates, and curing the layer at the bondline to form a cured adhesive bonded to each of the substrates.

11. A method of bonding two substrates, comprising forming a layer of the one-component polyurethane adhesive of claim 1 at a bondline between two substrates, and curing the layer at the bondline by contacting the layer with $H_2O$ to form a cured adhesive bonded to each of the substrates.

* * * * *